United States Patent [19]
Cannon et al.

[11] Patent Number: 4,911,381
[45] Date of Patent: Mar. 27, 1990

[54] ENERGY-ABSORBING LEG ASSEMBLY FOR AIRCRAFT PASSENGER SEATS

[75] Inventors: Mark R. Cannon, Chandler; Richard E. Zimmerman; James C. Warrick, both of Tempe, all of Ariz.

[73] Assignee: Simula, Inc., Phoenix, Ariz.

[21] Appl. No.: 138,047

[22] Filed: Dec. 28, 1987

[51] Int. Cl.⁴ .......................................... B64D 25/04
[52] U.S. Cl. .............................. 244/122 R; 248/503.1; 297/216; 410/115
[58] Field of Search ............. 244/122 R, 118.1, 118.6; 248/501, 502, 503, 503.1, 188, 188.1; 297/216, 249, 232; 410/101, 102, 104, 105, 113, 115; 296/65 R, 65 A, 63, 64; 403/145–148

[56] References Cited

U.S. PATENT DOCUMENTS

| | | | |
|---|---|---|---|
| 2,682,931 | 6/1954 | Young | 188/1 |
| 2,710,047 | 6/1955 | Duppstadt | 244/122 R |
| 2,933,127 | 4/1960 | Brewster | 244/122 R |
| 2,959,207 | 11/1960 | Brewster | 297/216 |
| 2,971,566 | 2/1961 | Negroni | 244/122 R |
| 3,145,051 | 8/1964 | Rausch | 297/216 |
| 3,603,638 | 9/1971 | McGregor | 297/216 |
| 3,785,600 | 1/1974 | Padovano | 248/188.1 |
| 4,026,218 | 5/1977 | Prete, Jr. | 410/104 |
| 4,062,298 | 12/1977 | Weik | 410/102 |
| 4,109,891 | 8/1978 | Grendahl | 410/102 |
| 4,185,799 | 1/1980 | Richards, Jr. | 410/105 |
| 4,230,432 | 10/1980 | Howell | 410/102 |
| 4,256,424 | 3/1981 | Knox | 410/105 |
| 4,375,300 | 3/1983 | Long | 244/122 R |
| 4,396,175 | 8/1983 | Long | 244/118.6 |
| 4,449,875 | 5/1984 | Brunelle | 410/105 |
| 4,493,470 | 1/1985 | Engel | 244/118.6 |
| 4,536,027 | 8/1985 | Brennan | 244/122 R |
| 4,708,549 | 11/1987 | Jensen | 248/503 |
| 4,718,719 | 1/1988 | Brennan | 244/122 R |

OTHER PUBLICATIONS

Drawing: "Fitting Assy–Front Leg, Anti-Rattle", Drawing No. 43021, Ancra Corp. El Segundo, Calif., Sep. 16, 1977.
Report and Document: "Aircraft Crash Survival Design Guide", vol. IV–Aircraft Seats, Restraints, Litters and Padding (USARTL-TR-79-22D), Jun. 1980.
Report: "Transport Controlled Impact Demonstration Seat Experiments and Cost Benefit Study", FAA Technical Center (DOT/FAA/CT-85-36), Oct. 1986.
Product release bulletin issued by Sabre Industries, Burbank, Calif., flyer dated Apr. 15, 1987.
Report: "Development of an Energy Absorbing Passenger Seat for B-720 Test Aircraft", published as technical information by American institute of Aeronautics and Astronautics.

Primary Examiner—Galen Barefoot
Attorney, Agent, or Firm—Cahill, Sutton & Thomas

[57] ABSTRACT

A leg assembly with special floor attachment fittings for mounting passenger seats in transport aircraft is disclosed as being especially configured to absorb energy resulting from a survivable crash or other cause of sudden deceleration, for increased passenger safety. The leg assembly includes a special base member having improved load distribution characteristics and legs which are attached to the base member and the seat in a way which allows the seat and legs to move to a forwardly stroked position in the event of inertial loading in excess of the value required to operate an energy absorbing mechanism that is provided on the leg assembly. The special floor attachment fittings are configured to absorb forces applied in various directions to minimize fitting failures and the changes of the seat being torn loose from the floor.

23 Claims, 3 Drawing Sheets

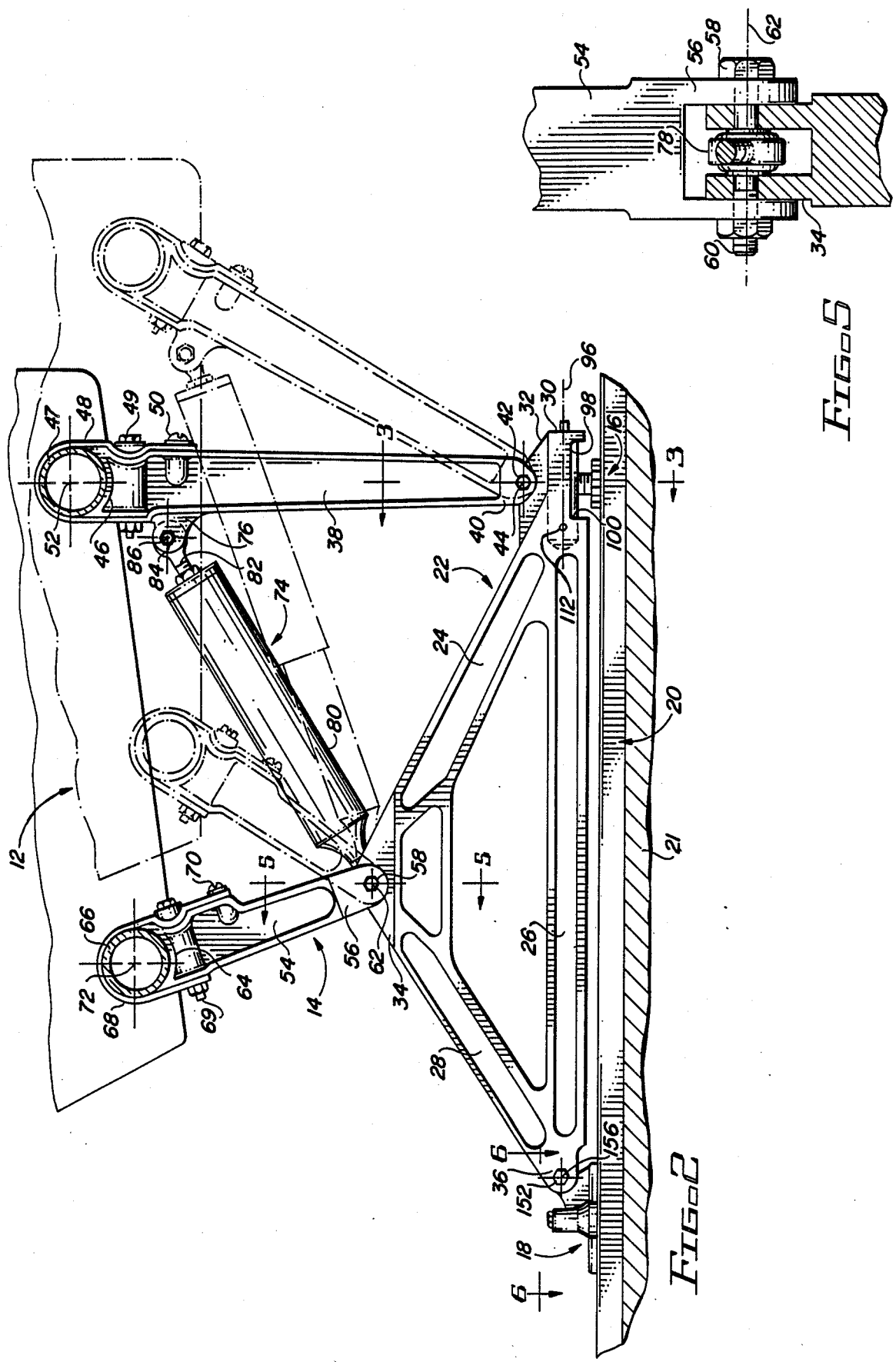

ENERGY-ABSORBING LEG ASSEMBLY FOR AIRCRAFT PASSENGER SEATS

BACKGROUND OF THE INVENTION

1. Field of the Invention

This invention relates in general to transport aircraft passenger seats and more particularly to an energy-absorbing leg assembly for such seats and including special fittings for attaching the leg assembly to the floor of the aircraft.

2. Description of the Prior Art

In recent years, considerable review, study and evaluation of transport aircraft accident data has been made in attempts to define areas where possible improvements in passenger safety could be achieved on transport airplanes in survivable accidents. It has been found with few exceptions, that aircraft manufactured in accordance with current aircraft standards and regulations provide adequate protection for the occupants. In survivable accidents, an airplane structure will remain substantially intact and provide a livable volume for the occupants throughout the impact sequence. However, among other things, some incidents of undesirable seat performances were found and they usually related to cabin floor displacement and excessive lateral inertial loads. Although injuries and fatalities seem to be decreasing in the more recent survivable crashes, seat performance continues to be a factor in such crashes with seat failures ranging from seat pan collapse to complete breakaway of the seat assembly from the floor.

Existing transport aircraft seat assemblies include relatively rigid leg structures, with the leg structure configuration varying from one manufacturer to another, and in most cases, the leg structures are attached by floor attachment fittings to elongated channel-like rails that are mounted in the floor of the aircraft so as to extend longitudinally of the fuselage.

It has been found that most of the prior art passenger seat assemblies are strong enough to withstand many of the types of loads to which they may be subjected in cases of survivable crashes or other causes of sudden deceleration such as could occur in emergency landings. More specifically, most prior art seat assemblies are capable of withstanding the upward, downward, forward and backward loads to which they may be subjected in survivable crashes, but it has been found that they fail when subjected to minimal amounts of sideward loading and they fail catastrophically when subjected to relatively light loads resulting from floor warpage.

Prior art transport aircraft passenger seat assemblies are prone to failures of the types discussed above in that the seat assemblies per se have poor load distribution characteristics and have very little energy-absorbing deformation capabilities due to such things as the torsional rigidity of the seat pan structure and due to the fasteners and attachment fittings which often fail prior to any significant energy-absorbing deformation of the major structural components of the seat assembly. As a result of such shortcomings, the occupants of the prior art passenger seat assemblies are often subjected to load forces which should ideally be absorbed by seat deformation in survivable crashes and the seat assemblies are often torn loose from the floor which must be prevented to improve passenger safety.

The attachment fittings which are employed for coupling the leg structures of the prior art passenger seat assemblies to the channel-like floor rails of the aircraft will, for the most part, react well to some of the types of loads which can be expected to occur in survivable accidents, but react poorly to others.

The attachment fittings commonly used for coupling the front legs of the prior art seat assemblies to the floor rails each include a threaded stud by which they are attached in a depending attitude from the bottom of the front legs. A circular disc is formed integrally on the lower end of the stud for placement within inverted T-slot channels of the floor rail in a position below an opposed pair of inwardly extending flanges of the floor rail. A lock nut is carried on the threaded stud for anchoring the disc, and thus the entire fitting, in place in the floor rail. The lock nut in addition to its anchoring function, serves as an anti-rattling device. From this it will be seen that the commonly used front leg attachment fittings will react well to loads which are perpendicular to the floor but fail to adequately react to forward, backward and sideward loads and further, make no provisions for reacting to floor deformation such as a rolling deformation around the aircraft's roll or pitch axes.

The attachment fittings most commonly used to attach the rear legs of the prior art seat assemblies to the floor rails each includes spaced apart pairs usually two, of oppositely extending feet which are located in the floor rail below the inwardly extending flanges thereof. The feet, and thus the entire fittings, are anchored in place by a mechanism that is commonly referred to as a "shear lock". Although the "shear locks" of these prior art fittings will differ somewhat from one manufacturer to another, they all function to prevent the fitting from sliding relative to the length of the floor rail and also serve as anti-rattlers. By preventing such sliding movement, the rear leg attachment fittings are anchored against being perpendicularly pulled away from the floor rails and thus react well to perpendicular loads. They also react well to forward and rearward loads due to their being held against sliding movements by the shear locks. These rear leg attachment fittings are provided with a rigid generally upstanding flange which is coupled to a mating flange provided on the lower end of the rear leg of the seat assembly by a bolt which is disposed so that the axis of its shank is parallel to the pitch axis of the aircraft. Thus such fittings react well to floor deformation in the form of a rolling warpage about the pitch axis of the aircraft in that the seat assembly can roll with the floor by rotation about the axis of the shank of the bolt which attaches the fitting to the rear leg. However, due to the rigid nature of the upstanding flange by which these rear leg attachment fittings are coupled to the legs, the fittings, for the most part, do not react well to floor deformation in the form of a rolling motion about the roll axis of the aircraft. In fact, when such floor deformation occurs, the rear leg attachment fittings will most often either break or be torn out of the floor rails.

One manufacturer of rear leg attachment fittings has recognized this problem and has devised a special fitting wherein the upstanding flange which is used to attach the fitting to the rear leg, is provided with a ball joint in which the shank of the mounting bolt is disposed. In this way, the fitting will react well to floor warpage in the form of rolling deformation about both the pitch and roll axes of the aircraft. While this prior art fitting is a considerable improvement from a passenger safety standpoint, it is also considerably more expensive.

In view of the above, it will be apparent that a need exists for a new and improved energy-absorbing leg assembly and floor attachment fittings for use with transport aircraft passenger seats which overcomes some of the problems and shortcomings of the prior art.

SUMMARY OF THE INVENTION

In accordance with the present invention, a new and improved energy-absorbing leg assembly with special floor attachment fittings is disclosed for use with transport aircraft passenger seats for eliminating, or at least reducing, the occurrence of passenger seat failures in survivable crashes or other causes of sudden deceleration such as emergency landings and the like.

As is well known in the art, transport aircraft passenger seats are rarely if ever provided as single separate seats, but instead are usually provided in side-by-side pairs, or groupings of three or more. Thus, a single leg assembly as described herein will include a single front leg and a single back leg but will always be used in conjunction with at least one additional and identical leg assembly.

The leg assembly of the present invention includes a base member in the preferred form of a truss of A-frame configuration for improved load distribution purposes, and having a front end, a rear end and an elevated apex. The seat assembly has a front leg the lower end of which is pivotably connected to the front end of the base member with its upper end being pivotably coupled to the seat pan frame proximate the front edge of the seat pan. A rear leg is provided which has its lower end pivotably coupled to the apex of the base member and has its upper end pivotably connected to the seat pan support frame proximate the rear edge of the seat pan. The pivot axes of the upper and lower ends of both the front and back legs are all parallel with respect to each other and with respect to the pitch axis of the aircraft. When in a normal position, the entire seat assembly will be supported in a normal substantially upright attitude above the base member and when a sudden impact occurs, the entire seat assembly will pivot forwardly and downwardly to what may be defined as a stroked position. The leg assembly is yieldably held in its upright normal position by an energy absorber means which is mounted so as to extend between the apex of the base member and the upper end of the front leg. The energy absorber means is normally in a retracted state and will move to an extended state in response to the expenditure of energy above a predetermined magnitude which is exerted in a direction that will tend to pull the opposite ends of the energy absorber means apart.

In the event of a crash or other cause of sudden deceleration, the inertial load of the seat and the occupant will be transferred in a manner whereby the seat assembly will tend to pivotably move from its normal to its stroked position and in doing so, the energy exerted by the inertial load will be attenuated by the energy absorber means as it moves from its retracted to its extended state. This not only reduces the load that is placed on the seats occupant, but it also reduces the load placed on the seat assembly and on the floor thereby decreasing the chances of the seat assembly being torn loose from the floor.

The floor attachment fittings by which the base member is coupled to the conventional floor rails of the aircraft are similar to the prior art attachment fittings so as to take advantage of their favorable reaction to many of the types of loads that can be exerted thereon in survivable accidents such as the forces exerted by loads that are perpendicular to the floor, forward and backward loads and the like. However, the fittings of the present invention are especially configured in a manner which differs from the prior art fittings to improve their reaction to the forces exerted thereon by floor deformation.

A cylindrical dowel is mounted at the front end of the base member so that it lies in a plane which is above and parallel to the floor and has its longitudinal axis parallel to the floor rail. The front attachment fitting has a threaded stud which is mounted in an internally threaded bore formed transversely in the dowel so that front fitting depends from the dowel. A circular disc is integrally carried on the lower end of the threaded stud for placement within the inverted T-slot of the floor rail and a lock nut is threadingly carried on the stud for anchoring the attachment fitting to the floor rail. In the event of floor deformation of the type wherein the floor rolls about the roll axis of the aircraft, a shear pin, which normally holds the dowel against rotation about its longitudinal axis, will be broken so that the forces which would otherwise be exerted on the fitting, i.e. sideward load, which could cause it either to fail or be torn loose from the floor rail, will merely cause rotation of the dowel about its longitudinal axis. In the event of floor deformation of the type wherein the floor rolls about the aircraft's pitch axis, the forces exerted by this type of floor warpage on the front attachment fitting will be at least partially attenuated by rolling of the entire base member with the floor with such movement being permitted by the pivot connection of the legs to the base member and a pivot connection of the rear attachment fitting to the base member as will be described below.

The rear attachment fitting which is used to couple the rear end of the base member to the floor rail includes a fitting body having at least two spaced apart pair of oppositely extending feet for placement within the inverted T-slot of the floor rail. A "shear lock" device is mounted on the fitting body to anchor the fitting in the floor rail, prevent it from sliding longitudinally in the floor rail, and to serve as an anti-rattle device. A generally upstanding flange is integral with the rear fitting body and has an opening formed therethrough for receiving a bolt which attaches the fitting to a mating flange provided at the rear end of the base member. The longitudinal axis of the bolt is parallel with respect to the pitch axis of the aircraft which allows the base member and the rear fitting to be pivotably moved relative to each other about the bolts axis in reaction to floor warpage in the form of rolling distortion about the aircraft's pitch axis. The fitting body is formed of a ductile metal and the upstanding flange is of thin cross section which is capable of withstanding the inertial loads but will bend and/or twist in response to forces resulting from floor deformation such as a rolling floor warpage about the roll axis of the aircraft.

Accordingly, it is an object of the present invention to provide a new and improved energy-absorbing leg assembly for transport aircraft passenger seats which reduces the chances for passenger injury resulting from seat failures due to survivable crashes or other causes of sudden deceleration.

Another object of the present invention is to provide a new and improved energy-absorbing leg assembly for transport aircraft passenger seats which includes a special base assembly that interacts with a special leg attachment arrangement for optimizing load distribution.

Another object of the present invention is to provide a leg assembly of the above described character wherein the legs are attached to the base member and to the seat frame in a manner which allows the seat assembly to move from a normal position to a forwardly and downwardly stroked position in a response to inertial loads above a predetermined value. An energy-absorbing means is provided to hold the seat assembly in its normal position in the absence of inertial loads above the predetermined value and for attenuating the forces exerted by inertial forces above that value when the seat assembly moves to its stroked position.

Another object of the present invention is to provide a new and improved energy-absorbing leg assembly which includes special attachment fittings for coupling the leg assembly to the floor rails of an aircraft with the attachment fittings being configured to absorb energy resulting from floor deformation.

Still another object of the present invention is to provide a new and improved fitting for securing various articles to the floor rails of an aircraft with the fitting being configured to absorb energy resulting from floor deformation for maintaining secured attachment of the articles.

The foregoing and other objects of the present invention as well as the invention itself may be more fully understood from the following description when read in conjunction with the accompanying drawings.

BRIEF DESCRIPTION OF THE DRAWINGS

FIG. 2 is an enlarged fragmentary sectional view taken along the line 2—2 of FIG. 1.

FIG. 5 is an enlarged fragmentary sectional view taken along the line 5—5 of FIG. 2.

DESCRIPTION OF THE PREFERRED EMBODIMENT

Figure 1:
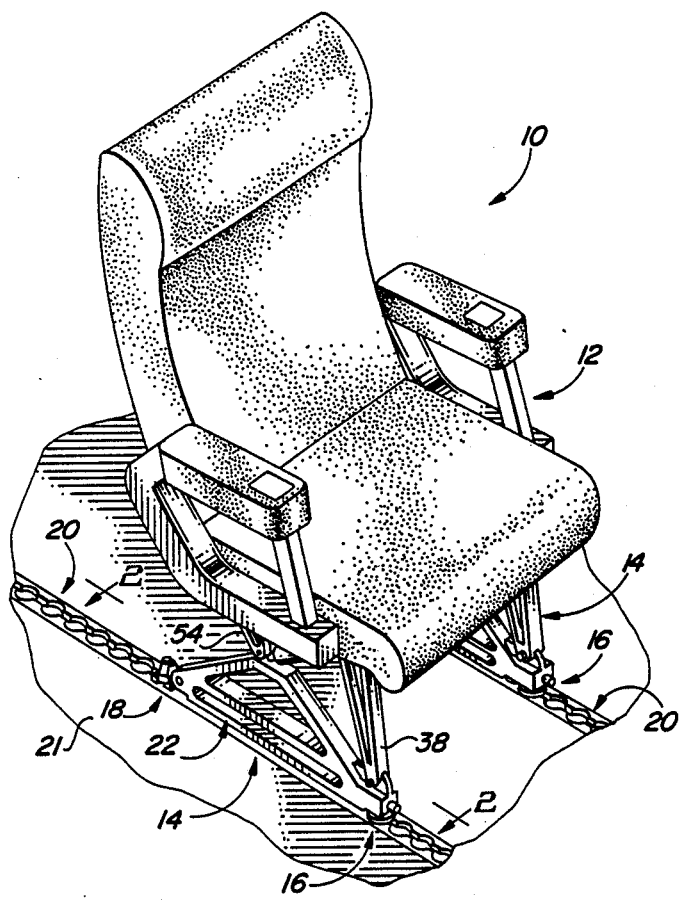
FIG. 1 is a perspective view of a typical aircraft passenger seat which is provided with an identical pair of the energy-absorbing leg assemblies of the present invention with the leg assemblies including special fittings for attachment to the floor rails of the aircraft.

Referring more particularly to the drawings, FIG. 1 shows a transport aircraft passenger seat assembly 10 which includes a typical upper seat portion 12 that is shown as being provided with an identical pair of leg assemblies of the present invention with each leg assembly being identified in its entirety by the reference numeral 14. As will hereinafter be described in detail, each of the leg assemblies 14 are provided with a special front attachment fitting 16 and a rear attachment fitting 18 by which the seat assembly 10 is demountably coupled to the floor rails 20 which are customarily provided in the floor 21 of passenger transport aircraft.

As is well known in the art, aircraft passenger seats are rarely if ever provided as single separate seats, but instead are usually formed in side-by-side pairs of seats, or in groupings of three or more. Therefore, the individual leg assemblies 14 are usually used in groups of two or more, as required to properly support the various seat groupings.

As seen best in FIG. 2, the leg assembly 14 includes a base member 22 in the preferred form of an A-frame, i.e. triangular, truss for load distribution purposes. The base member 22 includes a front beam 24, floor beam 26 and back beam 28 which cooperatively form the desired A-frame configuration. The front beam 24 is disposed to lie in a rearwardly and upwardly sloping attitude with its forwardly disposed end integrally joined with the front end of the floor beam 26 to form an enlarged body portion 30 with a planar upstanding lug 32. The back beam 28 is disposed to lie in a rearwardly and downwardly sloping attitude with the forward end integrally joined to the back end of the front beam to form the apex of the base member 22 which is in the form of a clevis 34, hereinafter referred to as the apex clevis 34. The back end of the floor beam 26 is integrally joined to the back end of the back beam 28 with a rear clevis 36 formed at that junction.

The leg assembly 14 further includes a front leg 38 which is provided with a clevis 40 on its lower end with a suitable bolt and nut arrangement 42 being used to mount the lower end of the front leg 38 to the upstanding lug 32 on the front end of the base member 22. As shown best in FIG. 3, the shank 43 of the bolt of the bolt-nut arrangement 42 defines an axis 44 about which the front leg 38 is pivotably movable for reasons which will hereinafter be described. The upper end of the front leg 38 is provided with an arcuate saddle 46 in which the front seat-frame tube 47 of the upper seat portion 12 is supported. A metal strap 48 is attached to the upper end of the front leg 38, such as by means of the illustrated bolt-nut arrangement 49 and screw 50, so as to be looped over the front seat-frame tube 47. In this way, the upper end of the front leg 38 is securely attached to the front seat-frame tube 47 and is pivotally movable about the longitudinal axis 52 of the front seat-frame tube 47.

A rear leg 54 is provided with a clevis 56 on its lower end and a bolt-nut arrangement 58 is employed to straddlingly mount the rear leg clevis 56 on the apex clevis 34 of the base member 22. As shown best in FIG. 5, the shank 60 of the bolt of the bolt-nut arrangement 58 defines an axis 62 about which the rear leg is pivotally movable. In a manner similar to the front leg 38, the upper end of the rear leg is provided with an arcuate saddle 64 in which the rear seat-frame tube 66 of the upper seat portion 12 is supported. A metal strap 68, which is attached to the upper end of the rear leg 54 by the illustrated bolt-nut arrangement 69 and screw 70, is looped over the rear seat-frame tube 66. In this manner, the upper end of the rear leg 54 is securely attached to the rear seat-frame tube 66 and is pivotally movable about the longitudinal axis 72 of the rear seat-frame tube.

The lower and upper pivot axes 44 and 52 of the front leg 38 and the lower and upper axes 62 and 72 of the rear leg 54 are all parallel with respect to each other and are also parallel with respect to the pitch axis of an aircraft. To insure a clear understanding of this, the pitch axis of an aircraft is transverse to the longitudinal axis of the aircraft fuselage and the longitudinal axis of the aircraft fuselage is referred to in the art as the roll axis of the aircraft. As shown in solid lines in FIG. 2, the leg assembly 14, and thus the entire seat assembly 10, has a normal upright position and can be pivotably moved to a stroked position which is shown in dashed lines in the same figure. The purpose for such a seat stroking capability is to absorb, or attenuate energy in the event of a survivable crash or other cause of sudden deceleration as will hereinafter be described in detail.

The leg assembly 14 further includes an energy absorber means 74. Energy absorbing, or load limiting mechanisms as they are sometimes referred to in the art, are well known and are commercially available. Such mechanisms operate in various ways for absorbing compression and/or tension loads and, as will become apparent, the energy absorber means 74 shown in the accompanying drawings is the type which absorbs tension loads, and has a high resistance to rebounding forces. In otherwords, the energy absorber means 74 has a normally retracted, or unstroked, position which is shown in solid lines in FIG. 2, and will move to an extended, or stroked, position which is shown in dashed lines in the same figure, when a tension load above a predetermined value is applied thereto. A suitable energy absorber is commercially available as part number 102239 from Simula Inc., 10016 South 51st Street, Phoenix, Arizona 85044.

In the preferred embodiment, the energy absorber means 74 is mounted so as to extend between the apex clevis 34 of the base member 22 and the rearwardly extending clevis 76 formed integrally with the front leg 38 proximate its upper end. As shown in FIG. 5, a swivel-joint type eye bolt 78, which extends axially from one end of the energy absorber's cylindrical body 80, is attached to the shank 60 of the bolt-nut arrangement 58 so as to be carried in the apex clevis 34 of the base member 22 for pivotable movement about the axis 62 defined by the bolt of the bolt-nut arrangement 58. A similar swivel-joint type eye bolt 82 which extends axially from the opposite end of the cylindrical body 80 is mounted in the clevis 76 at the upper end of the front leg by means of a suitable bolt-nut arrangement 84 for pivotable movement about the axis 86 defined thereby.

While the above described energy absorber 74 and its particular mounting arrangement constitute the preferred embodiment, a compression type energy absorber and different mounting arrangement (not shown) could be employed to achieve the same results. For example one end of a compression type energy absorber, as opposed to the tension-type absorber 74, could be mounted between the upstanding flange 32 of the base member 22 and the upper end of the rear leg 54.

In either case, the energy absorber 74 will hold the leg assembly 14, and thus the entire seat assembly 10 in its upright, or non-stroked, position during normal usage. However, if a survivable crash or other event should cause a sudden deceleration of the aircraft, the inertial load of the seat and the occupant will be transferred in a manner which will tend to move the seat assembly 10, and of course the energy absorber 74, to the stroked position. When, and if, this should occur the inertial forces which would otherwise be exerted on the occupant and on the seat assembly 10 will be reduced to greatly increase the chances of occupant survival and significantly reduce the chances of the seat assembly being torn away from the floor as a result of such forces.

As a result of the A-frame configuration of the base member 22 which produces a substantially even load distribution between the front and rear floor attachment points, and the inertial force attenuation provided by the seat and energy absorber stroking capability, several other benefits are achieved. Since the loads applied to the seat assembly as a result of a survivable crash or the like will be significantly reduced, the various seat components can be designed to begin deformation at lower load factors than are possible with rigid, non-stroking seats, and this allows lower seat weight. Also, since the forces applied to the floor attachment points will be reduced, the spacing between the front and back legs can be reduced to increase the passenger carrying capacity of the aircraft and possibly accomplish this with improved passenger ingress and egress.

Before proceeding with the detailed descriptions of the front and rear floor attachment fittings 16 and 18, it is believed that a brief description of the floor rails 20 that are usually provided in transport passenger aircraft will facilitate the understanding of the fittings. As seen best in FIG. 7, each of the floor rails 20 that are customarily provided, are in the form of an elongated channel member 88 having an upwardly opening slot 90 formed therein which may be described as an inverted substantially T-shaped in cross section slot. The slot 90 however, is not T-shaped along its entire length in that the inwardly extending cofacing flanges which overlay the slot are actually formed as an alternating array of arcuate cutouts or recesses 91 between inwardly projecting land areas, or ledges 92.

Figure 3:
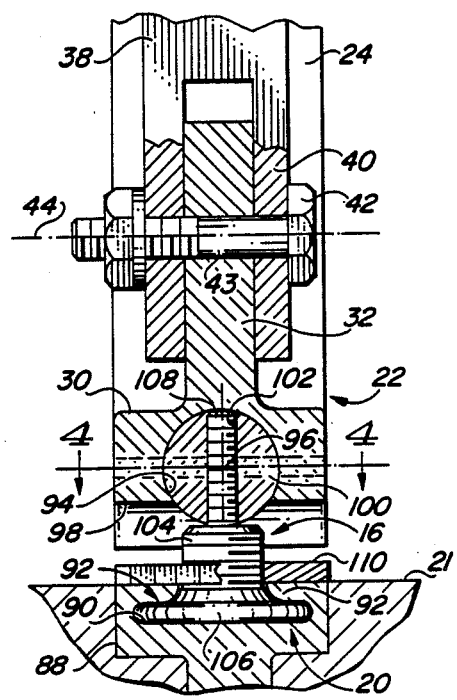
FIG. 3 is an enlarged fragmentary sectional view taken along the line 3—3 of FIG. 2.
Figure 4:
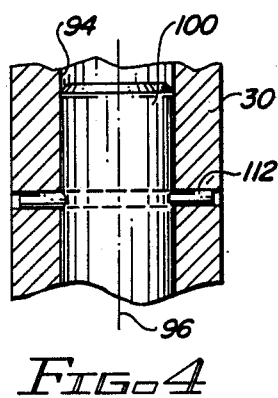
FIG. 4 is an enlarged fragmentary sectional view taken along the line 4—4 of FIG. 3.

Reference is now made to FIGS. 2, 3 and 4 wherein the front floor attachment fitting 16 and a special mounting arrangement are best seen. The enlarged body portion 30 formed at the front end of the base member 22, is provided with a blind cylindrical bore 94 which opens forwardly of the base member 22. The bore 94 is disposed so that its longitudinal axis 96 is coincident with the longitudinal dimension of the floor beam 26 and the enlarged body 30 is notched as at 98 so that the bore 94 opens downwardly immediately above the floor rail 20. A cylindrical pin 100, or dowel, is mounted in the blind bore 94 and the pin 100 is provided with an internally threaded transverse bore 102 in which the front floor attachment fitting 16 is mounted so as to depend from the dowel pin 100. The floor attachment fitting 16 is a commonly used well known fitting which is commercially available, such as from the Ancra Corporation of El Segundo, California as Part No. 43021. The fitting 16 includes a threaded shank portion 104 with a disc shaped foot 106 at one end and having a reduced diameter threaded stud 108 extending axially from the other end. A lock nut 110 is threadingly carried on the shank portion 104 of the attachment fitting 16 and serves as an anti-rattler. Installation of the front attachment fitting 16 in the floor rail 20 is accomplished by moving the disc-shaped foot 106 downwardly through an aligned pair of the arcuate recesses 91 of the rail so as to locate the foot 106 in the slot 90 of the rail 20. Then the fitting 16 is moved longitudinally in the rail 20 to bring the foot 106 underneath an aligned pair of the inwardly extending land areas, or ledges 92. The lock nut is then threadingly moved downwardly on the threaded shank portion 104 into bearing engagement with the top surface of the floor rail 20.

As shown best in FIG. 4, a shear pin 112 is mounted so as to pass transversely through the enlarged body portion 30 of the base member 22 and transversely through the dowel pin 100. The shear pin 112 holds the dowel pin 100 against rotation about the longitudinal axis 96 of the bore 94 in which it is mounted. In the event of a survivable crash or the like, which causes floor deformation of the type wherein the floor 21 and/or the floor rail 20 rolls about the roll axis of the aircraft, the shear pin 112 will be sheared to allow the dowel pin 100 to rotate about the axis 96 thereby reducing the forces which would tend to tear the fitting 16 away from the floor 21 or alternatively cause failure of the fitting 16 or the part to which it is attached.

Figure 7:
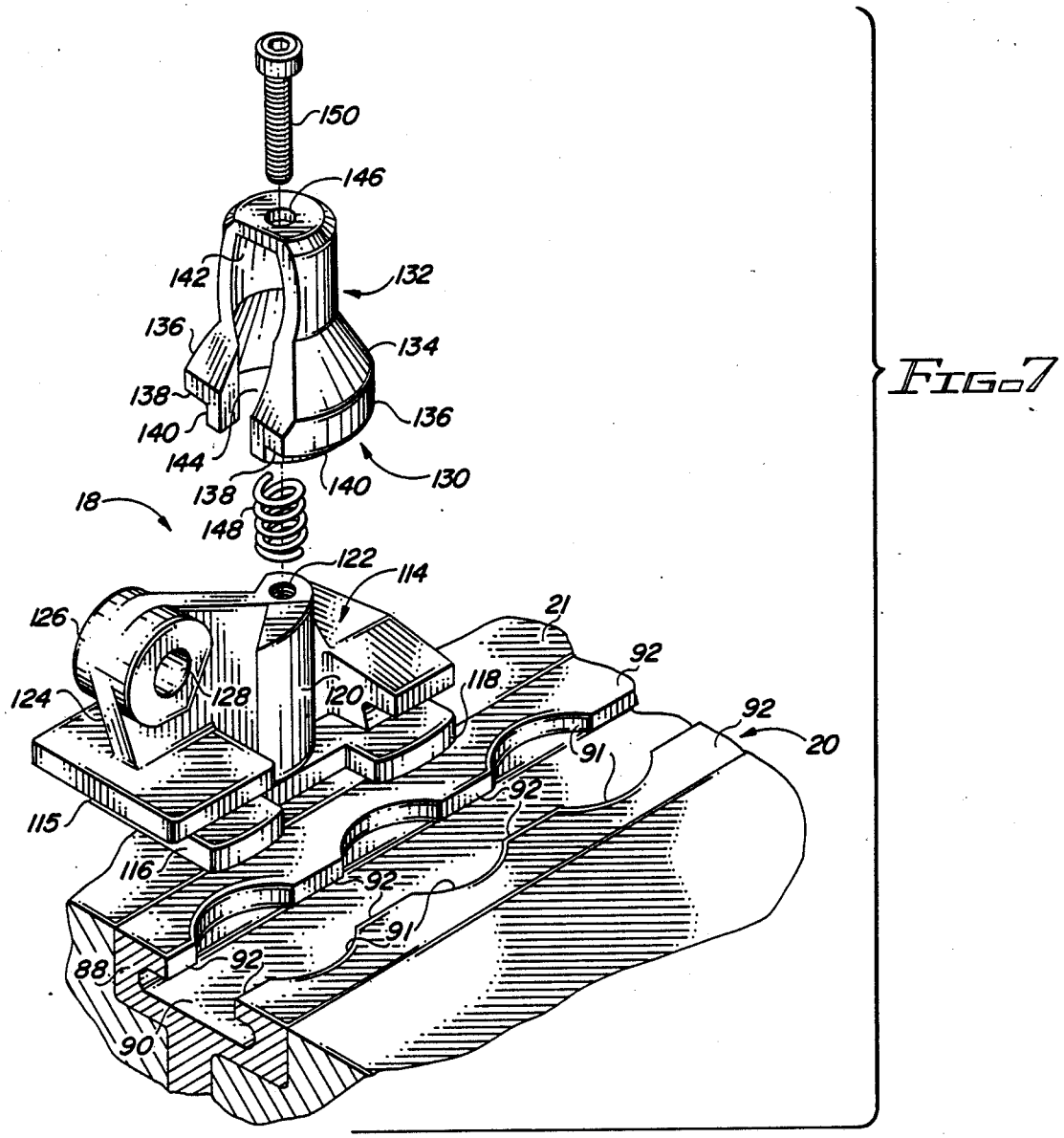
FIG. 7 is an exploded perspective view, of an especially configured attachment fitting and showing its mounting relationship with respect to a conventional floor rail of an aircraft.
Figure 8:
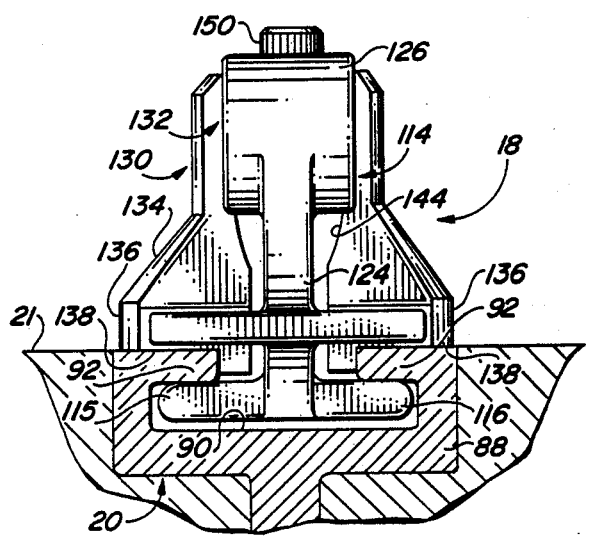
FIG. 8 is an enlarged fragmentary sectional view taken along the line 8—8 of FIG. 6.

As seen best in FIG. 7, the rear floor attachment fitting 18 includes a fitting body 114 having at least a front pair of oppositely extending feet 115 and 116 and a rear pair of oppositely extending feet 117 and 118. A boss 120 is provided intermediate the two pair of feet and is disposed so as to extend normally from the plane in which the feet 115, 116, 117 and 118 lie, and an internally threaded bore 122 is formed axially in the boss 120 so as to open upwardly of the boss. The fitting body 114 also is formed with a mounting lug or flange 124 which lies in a plane that is normal with respect to the plane in which the feet 115, 116, 117 and 118 lie and extends integrally from the boss 120 in a direction which may be described as extending forwardly and upwardly relative to the fitting body 114. A substantially cylindrical enlargement 126 is formed at the upper and forwardmost end of the mounting flange 124 and a bore 128 is formed to extend axially through the enlargement 126 in a direction transverse to the plane of the mounting flange 124.

In addition to the fitting body 114 described above, the rear floor attachment fitting 18 includes a locking mechanism 130 which locks the fitting 18 in the floor track 20 and serves as an anti-rattling device. The locking mechanism 130 includes a housing 132 of generally cylindrical configuration which is flared outwardly as at 134 to provide a diametrically opposed pair of pads 136 which define downwardly facing shoulders 138, with a substantially circular rim 140 depending axially from between the shoulders. The housing 132 defines a downwardly opening axial bore 142 and the housing is cut away to provide an opening 144 laterally of the bore 142. The top end of the housing 132 is provided with an opening 146 that opens axially into the bore 142 of the housing. In addition to the housing 132, the locking mechanism 130 also includes a biasing means 148 in the illustrated form of a compression spring, and a hold down bolt 150.

Figure 9:
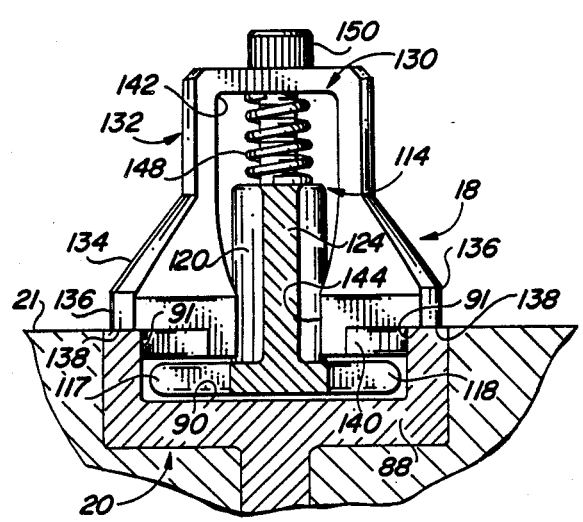
FIG. 9 is an enlarged fragmentary sectional view taken along the line 9—9 of FIG. 6.

The housing 132 of the locking mechanism 130 is mounted on the fitting body 114 so that the boss 120 of the fitting body is axially and loosely disposed in the bore 142 of the housing as seen best in FIG. 9. The compression spring 148 is interposed between the top of the boss 120 and the inwardly facing surface of the top of the housing so as to bias the housing to an axially elevated position on the fitting body 114. The hold down bolt 150 passes through the opening 146 of the housing 132, axially through the spring 148 and is in threaded engagement with the internally threaded bore 122 formed in the boss 120 of the fitting body 114.

Mounting of the rear floor attachment fitting 18 to the floor rail 20 is accomplished by aligning the front pair of feet 115 and 116 of the fitting body 114 with a desired aligned pair of the arcuate recesses 91 of the rail 20, which will automatically align the rear pair of feet 117 and 118 with an adjacent pair of the recesses 91, and lowering the fitting body 114. This will place the extending feet 115, 116, 117 and 118 in the bottom of the slot 90 of the rail 20 and the lowering movement is followed by sliding the fitting body 114 longitudinally of the rail so as to move the feet 115, 116, 117 and 118 underneath different ones of the inwardly projecting ledges 92 of the floor rail 20. When the feet 115, 116, 117, and 118 are located under the ledges 92, an aligned pair of the recesses 91 will be located between the feet 115, 116, 117, and 118, and the housing 132 of the locking mechanism 130 is then pushed downwardly so as to move axially on the boss 120 of the fitting body 114 against the bias of the spring 148. In the down position of the housing 132, the depending circular rim 140 of the housing is located between the aligned recesses 91 that are disposed between the feet 115, 116, 117, and 118, and the shoulders 138 of the housing 132 will bear downwardly on the upper surface of the floor rail 20. The hold down bolt 150 is tightened, i.e. threaded downwardly to hold the locking mechanism 130 in the down, or locking position. With the depending rim 140 located in the aligned arcuate recesses 91 of the floor rail, the fitting body 114 is held fast against sliding movement in the floor rail 20 and since the feet 115, 116, 117 and 118 are under the ledges 92, the fitting body cannot be lifted out of the floor rail 20. Tightening of the hold down bolt 150 will pull the fitting body 114 upwardly so that the feet 115, 116, 117 and 118 will tightly bear against the undersides of the ledges 92, and will pull the housing 132 down so that the shoulders 138 will tightly bear against the top surface of the floor rail 20, and this prevents rattling of the rear floor attachment fitting 18 in the floor rail 20.

Figure 6:
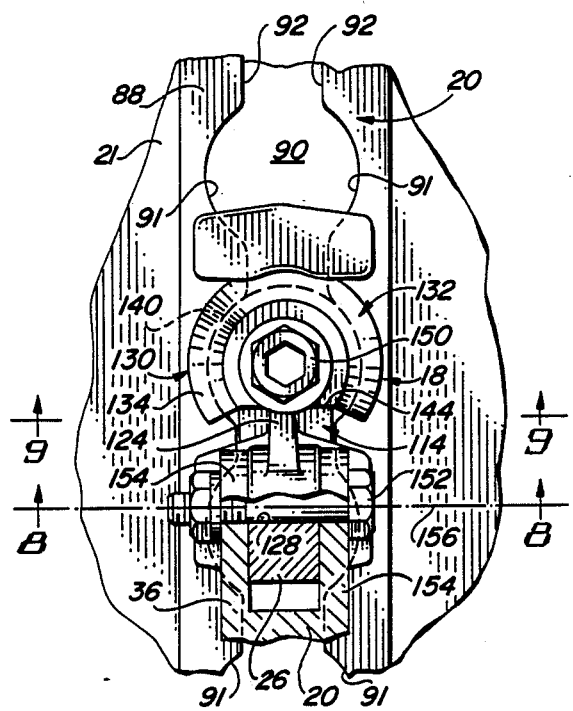
FIG. 6 is an enlarged fragmentary sectional view taken along the line 6—6 of FIG. 2.

The above described rear floor attachment fitting 18 may be used to secure virtually anything to the floor 21 of an aircraft, such as cargo, and the fitting 18 is shown best in FIGS. 2 and 6 as being employed to secure the back end of the base member 22 of the leg assembly 14 to the floor rail 20. The rear clevis 36 of the base member 22 is straddlingly positioned on the cylindrical enlargement 126 of the mounting lug 124 of the fitting body 114 and a suitable bolt-nut assembly 152 is passed through the aligned openings provided in the tines 154 of the rear clevis 36 and through the bore 128 of the enlargement 126 of the mounting lug 124. Therefore, seat assembly 10 is free to rotate about the longitudinal axis 156 of the bolt-nut assembly 152 and the floor attachment fitting 18 is free to rotate about the same axis to prevent or at least minimize the transmission of forces between the leg assembly 14 and the fitting 18 as a result of loads being applied that cause relative movements about the pitch axis of the aircraft.

The fitting body 114, or at least the mounting lug 124 thereof, is formed of a ductile metal so that the mounting lug 124 will bend and/or twist to prevent, or at least minimize the transmission of forces between the leg assembly 14 and the rear floor attachment fitting 18 as a result of loads which cause relative movements about the roll axis of the aircraft.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What we claim is:

1. An energy absorbing leg assembly for attaching an aircraft passenger seat to the floor of an aircraft to attenuate the forces affecting the passenger seat and its occupant in the event of a crash or other cause of sudden deceleration, said leg assembly comprising in combination:
   (a) a base member to be attached to the floor of the aircraft, said base member having a triangular configuration defining a front end, a rear end and an apex elevated relative to the front and rear ends and disposed intermediate the front and rear ends, said base member being in a plane perpendicular to the floor of the aircraft when attached thereto;
   (b) a front leg having a lower end pivotally connected to the front end of said base member for pivotal movement about an axis transverse to the plane of said base member from a normal substantially upright position to a forwardly stroked position;
   (c) a rear leg having a lower end pivotally connected to the apex of said base member for pivotal movement about an axis transverse to the plane of said base member from a normal substantially upright position to a forwardly stroked position;
   (d) means disposed on each of said front rear legs for pivotally attaching the aircraft passenger seat to permit movement of the aircraft passenger seat with said front and rear legs from the respective normal substantially upright positions to the respective forwardly stroked positions; and
   (e) energy absorber means for holding said front and rear legs and the aircraft passenger seat supported in the respective normal substantially upright positions, said energy absorber means responding to inertial loading above a predetermined magnitude with an attenuating force as said front and rear legs and the aircraft passenger seat move toward their respective forwardly stroked positions.

2. An energy absorbing leg assembly as claimed in claim 1 wherein the aircraft passenger seat includes a tubular seat frame, said front leg including a first upper end, said rear leg including a second upper end and wherein said pivotally supporting means comprises:
   (a) a first strap mounted upon said first upper end for looped around positioning on the tubular frame to allow relative pivotal movement about an axis transverse to the plane of said base member; and
   (b) a second strap mounted upon said second upper end for looped around positioning on the tubular frame to allow relative pivotal movement about an axis transverse to the plane of said base member.

3. An energy absorbing leg assembly as claimed in claim 1 further comprising:
   (a) said front leg having an upper end; and
   (b) means for connecting one end of said energy absorber means to the apex of said base member to accommodate pivotal movement about an axis transverse to the plane of said base member and means for coupling an opposite end of said energy absorber means to a location proximate the upper end of said front to accommodate pivotal movement about an axis transverse to the plane of said base member.

4. An energy absorbing leg assembly as claimed in claim 3 wherein said energy absorber means comprises a longitudinally extensible mechanism having a retracted state when said front and rear legs and the supported aircraft passenger seat are in their normal substantially upright positions.

5. An energy absorbing leg assembly as claimed in claim 1 and comprising:
   (a) a front floor fitting means mounted at the front end of said base member and means for demountably attaching said front floor fitting means to the floor of the aircraft; and
   (b) a rear floor fitting means mounted at the rear end of said base member and means for demountably attaching said rear floor fitting means to the floor of the aircraft.

6. An energy absorbing leg assembly as claimed in claim 1 and comprising:
   (a) the front end of said base member including a cylindrical bore lying in the plane of said base member and having a longitudinal axis parallel with the floor of the aircraft on attachment of said base member to the floor, said base member including a notch formed at the bottom front end in communication with said bore;
   (b) a cylindrical dowel pin rotatably mounted in said bore along the longitudinal axis of said bore;
   (c) means mounted at the front end of said base member for holding said dowel pin against rotation in said bore and for releasing said dowel pin upon application of a load above a predetermined magnitude in a direction transverse to the plane of said base member; and
   (d) fitting means attached to said dowel pin and depending therefrom through said notch for engaging the floor of the aircraft.

7. An energy absorbing leg assembly as claimed in claim 6 wherein said leg assembly is attachable to the floor of the aircraft which floor is provided with an elongated floor rail of generally inverted T-slot cross-section, and wherein said fitting means comprises:
   (a) a threaded shank having an upper end attached to said dowel pin;
   (b) a circular disc formed at the lower end of said threaded shank for engaging the inverted T-slot of the floor rail; and
   (c) a locknut threadedly carried on said threaded shank for bearing against the floor rail.

8. An energy absorbing leg assembly as claimed in claim 1 wherein the floor of the aircraft includes an elongated floor rail of generally inverted T-slot cross sectional configuration, said leg assembly comprising a rear floor attachment fitting pivotally coupled to the rear end of said base member for pivotal rotation about an axis transverse to the plane of said base member.

9. An energy absorbing leg assembly as claimed in claim 8 wherein said rear floor attachment fitting comprises:
   (a) a fitting body for disengagably engaging the floor rail; and
   (b) a mounting lug extending from said fitting body for pivotally coupling the rear end of said base member, said mounting lug being of relatively thin configuration and being formed of a ductile metal capable of bending and twisting deformation in response to a load above a predetermined magnitude applied in a direction substantially transverse to the plane of said base member.

10. An energy absorbing leg assembly as claimed in claim 9 wherein said fitting body is formed of ductile metal to provide the capability of bending and twisting movements in response to a component of the load supplied in a direction which is predominantly coextensive with at least one of the axes of the aircraft.

11. An energy absorbing leg assembly as claimed in claim 1 including a fitting for attaching said base member to the floor of the aircraft having pitch, roll and yaw axis movement, which aircraft has at least one elongated floor rail with an upwardly opening slot formed longitudinally therein, which slot is overlayed by a pair of inwardly extending spaced apart flanges, each of which flanges defines an alternating series of arcuate recesses and inwardly projecting ledges, said fitting comprising:

(a) a fitting body for attaching said base member to the floor rail, said fitting body having at least two pair of oppositely extending feet to be placed in the slot of the floor rail below adjacent transversely aligned pairs of the ledges of the floor rail, said pairs of feet being in spaced apart relationship to locate an opposed pair of the arcuate recesses of the floor rail between said pairs of feet when said fitting body is attached to the floor rail;

(b) locking means mounted on said fitting body for selective positioning into the space between an opposed pair of arcuate recesses located between said pairs of feet; and (c) a mounting lug extending from said fitting body and including means for coupling said mounting lug with said base member, said mounting lug being formed of ductile metal and capable of bending and twisting movements in response to a component of the loads applied in a direction predominantly coextensive with at least one of the axes of the aircraft.

12. A fitting as claimed in claim 11 comprising:
(a) said fitting body including a boss extending upwardly between said two pair of oppositely extending feet;
(b) said locking means including,
  I. a housing having a downwardly opening bore for loosely receiving said boss to accommodate movement between upwardly and downwardly disposed positions on said boss,
  II. a substantially circular rim disposed on the lower end of said fitting body, said rim being positioned in the space between the aligned pair of arcuate recesses of the floor rail when said fitting is attached to the floor rail and said housing is in the downwardly disposed position on said boss,
  III. biasing means interposed between said boss and said housing for urging said housing to the upwardly disposed position on said boss, and
  IV. hold-down fastener means for selectively holding said housing in the downwardly disposed position on said boss.

13. A fitting as claimed in claim 12 wherein said mounting lug extends from said fitting body in a direction coincident with the longitudinal extension of the floor rail to which it is to be attached, said mounting lug having a bore formed transversely therethrough at a location proximate the extending end of said mounting lug, the axis of the bore forming a pivot axis parallel with the pitch axis of the aircraft.

14. A fitting as set forth in claim 12 wherein said coupling means allows relative pivotal movement about the pitch axis of the aircraft.

15. A fitting as set forth in claim 11 wherein said coupling means allows relative pivotal movement about the pitch axis of the aircraft.

16. An energy absorbing leg assembly for attaching an aircraft passenger seat to the floor of an aircraft to attenuate the forces affecting the passenger seat and its occupant in the event of a crash or other cause of sudden deceleration, said leg assembly comprising:

(a) a base member of substantially triangular shape defining a front end, a back end and an apex in elevated relationship to said front and back ends and disposed intermediate said front and back ends, said base member lying in a plane perpendicular to the floor of the aircraft when attached thereto;

(b) a front leg having a lower end attached to said front end for pivoting about an axis transverse to the plane of said base member in response to movement of said front leg between a normal generally upstanding position and a forwardly stroked position;

(c) first means disposed on an upper end of said front leg for pivotally attaching the passenger seat to accommodate pivotal movement about an axis transverse to the plane of said base member upon movement of said front leg from the upstanding position to the forwardly stroked position;

(d) a rear leg having a lower end attached to said apex for pivoting about an axis transverse to the plane of said base member in response to movement of said rear leg between a normal generally upstanding position and a forwardly stroked position;

(e) second means disposed on an upper end of said rear leg for pivotally attaching the passenger seat to accommodate pivotal movement about an axis transverse to the plane of said base member upon movement of said rear leg from the upstanding position to the forwardly stroked position; and (f) energy absorber means mounted between said apex and the upper end of said front leg for yieldably holding said front and rear legs and the passenger seat in the normal generally upstanding position and for responding to inertial loading above a predetermined magnitude with a force attenuating motion when said front and rear legs and the passenger seat are urged to their forwardly stroked positions.

17. An energy absorbing leg assembly as claimed in claim 16 wherein the aircraft passenger seat includes a tubular seat frame and said first pivotally attaching means comprises a strap for engaging the tubular seat frame.

18. An energy absorbing leg assembly as claimed in claim 16 wherein the aircraft passenger seat includes a tubular seat frame and said second pivotally attaching means comprises a strap for engaging the tubular seat frame.

19. An energy absorbing leg assembly as claimed in claim 17 wherein said energy absorber means comprises a longitudinally extensible mechanism for attenuating a force urging extension, said mechanism being retracted when said front and rear legs are in their normal substantially upright positions.

20. An energy absorbing leg assembly as claimed in claim 16 and further comprising:

(a) a front floor attachment fitting means mounted at said front end of said base member for engaging the floor of the aircraft; and (b) a rear floor attachment fitting means mounted at said rear end of said base member for engaging the floor of the aircraft.

21. An energy absorbing leg assembly as claimed in claim 16 and further comprising:

(a) said base member including a cylindrical bore formed at said front end and lying in the plane of said base member and having a longitudinal axis parallel with the floor of the aircraft when said base member is attached thereto, said base member including a downwardly oriented notch formed at its front in communication with said bore;

(b) a cylindrical dowel pin mounted in said bore for rotating about the longitudinal axis of said bore;

(c) means mounted at said front end of said base member for holding said dowel pin against rotation in said bore and for releasing said dowel pin to rotate upon application of a load above a predetermined magnitude in a direction transverse to the plane of said base member; and (d) fitting means depending from said dowel pin through said notch for disengagably engaging the floor of the aircraft.

22. An energy absorbing leg assembly as claimed in claim 21 wherein the floor of the aircraft is provided with an elongated floor rail of generally inverted T-slot cross-section, and wherein said fitting means comprises:

(a) a threaded shank having its upper end attached to said dowel pin;

(b) a circular disc formed on the lower end of said threaded shank for engaging the inverted T-slot of the floor rail; and (c) a locknut threadingly carried on said threaded shank for bearing against the floor rail when said disc is mounted within the floor rail.

23. An energy absorbing leg assembly as claimed in claim 20 wherein said rear floor attachment fitting means is formed of ductile metal to provide the capability of bending and twisting movements in response to a component of the load supplied in a direction which is predominantly coextensive with at least one of the axes of the aircraft.

* * * * *